INVENTOR.
THOMAS A. BATEMAN, SR.
BY
Berman, Davidson & Berman
ATTORNEYS.

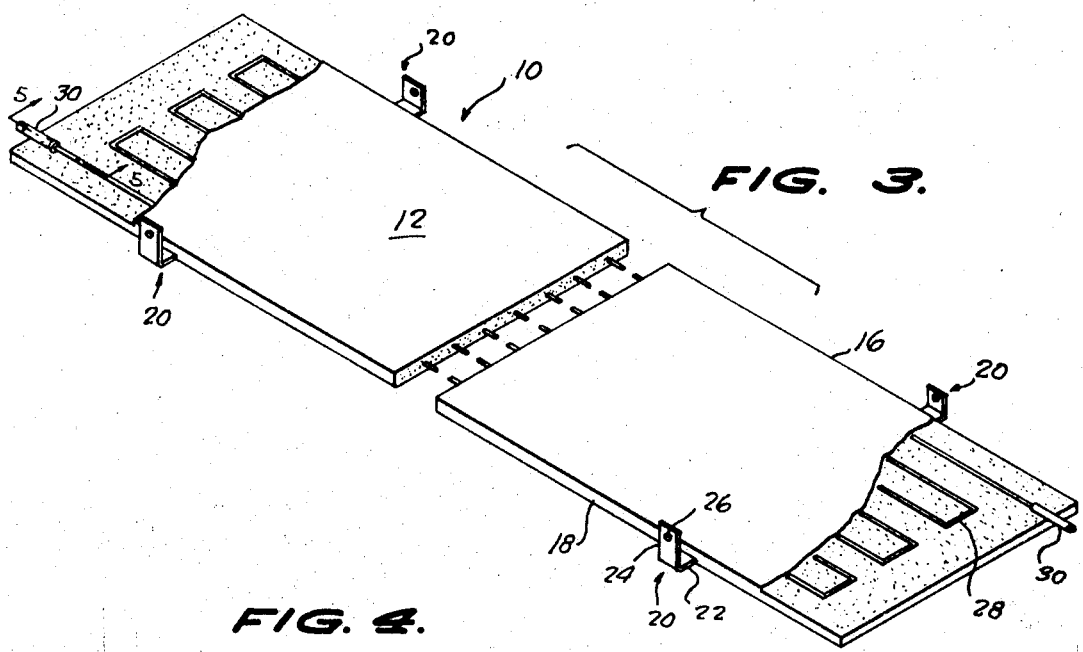
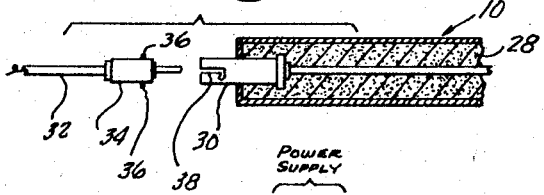
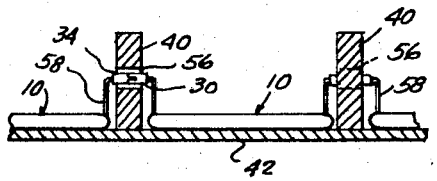
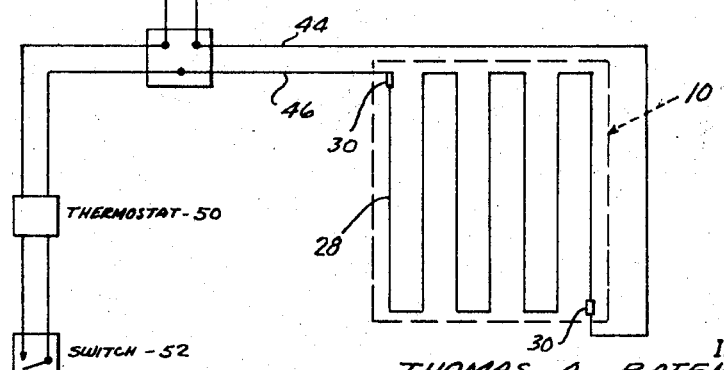

# United States Patent Office 3,445,628
Patented May 20, 1969

3,445,628
ELECTRIC RADIANT HEATING PANEL
Thomas A. Bateman, Sr., 108 Kanawha Ave. S.,
Nitro, W. Va. 25143
Filed Sept. 16, 1966, Ser. No. 580,012
Int. Cl. H05b 3/02
U.S. Cl. 219—345                         2 Claims

ABSTRACT OF THE DISCLOSURE

A flat rectangular radiant heating panel has a centrally positioned insulated heating element embedded therein. The element is disposed in a serpentine pattern and terminates at each end in a separable connector element partially embedded in a side edge of the panel. The panel is adapted to be installed flat against an unexposed, internal surface of an existing building wall and is dimensioned to fit between adjacent studs or joists in the wall. Brackets partially embedded in and along the edges of the panel provide means for securing the panel in place between the studs or joists. A plurality of panels can be electrically connected together in series by means of jumpers.

---

This invention relates to radiant heating panels for building structures, and the like, and is particularly directed to a radiant heating panel which can be installed and removed without marring, or otherwise disturbing or harming the exposed surface of an interior wall of a room, or chamber, behind or above which it is secured.

The practice of heating enclosures by use of radiant, electrical wall units has become increasingly popular. Initially, such units, or panels, were formed by providing lengths of electric heating cable, which were then tailored to the room size and to the wall in which they were embedded during fabrication of the wall. Thus the wall and its radiant heat emanating element were integrally formed at the time of construction, or if at a later time, by ripping out the existing wall and building another wall incorporating the radiant heating unit. Obviously, this method was difficult and expensive, capable of performance only by skilled men, and subject to the further disadvantage that upon failure of the heating cable no means existed for repair thereof without ripping out the entire wall, or a portion thereof, and subsequently rebuilding the same.

Under later practice, prefabricated, modular radiant heating panels are supplied for affixing to the exposed surface of the wall, as for example, beneath a ceiling, and to which they are attached by driving nails, or other fastening elements, through openings in the panels spaced from the heating cables, or through the panels at points indicated to be spaced from the heating cable by markings on the surfaces of the heating panels. These panels are subject to the disadvantages, that the exposed surface to which the panels are attached are disfigured by the means for attachment, and the exposed surfaces of the attached panels are also marred by the fastening means, so that it becomes necessary to either decorate the exposed surfaces of the radiant heating panels or provide a covering layer thereover.

It is an object of the present invention to provide an improved radiant heating panel and method for installation thereof which avoid the above-named disadvantages of existing panels and building constructions.

It is a primary object of the invention to provide an improved radiant heating panel which may be installed behind or above an existing wall of a building, that is adjacent the unexposed surface thereof, in such a way as to avoid disturbance to the exposed surface of the wall during installation and permitting removal, repair or replacement of the panel without marring or otherwise disturbing the exposed surface of the existing wall.

It is another object of the invention to provide an improved radiant heating panel, having the above-described characteristics, and which, when installed, efficiently conducts heat to the existing wall, whereby the exposed surface of the wall becomes the radiant heating surface for the room, or chamber, partially enclosed by the wall.

A further object of the invention is to provide means whereby the installation of radiant heating units is simplified so that unskilled persons may readily install a radiant heating system which will operate efficiently and satisfactorily, provision being made of prefabricated units constructed in a manner which renders them practical for installation at a minimum cost by persons having but a minimum of experience.

Yet another object of the invention is to provide an improved radiant heating panel, having the above-described characteristics, which after installation can be readily removed and replaced, or repaired, by persons having a minimum of skill and experience without the necessity for destroying the entire wall, or a portion thereof, adjacent which the heating panels are installed.

Still another object of the invention is to provide an improved radiant heating panel, having the above-described characteristics, which can be supplied in standardized modular sizes to fit between conventional spaced wall supporting studs, or ceiling supporting joists, and which are secured to said studs or joists by fastening means entirely spaced from the heating cables embedded in the panels, as well as from the wall or ceiling against which the heating panels are pressed by the fastening means.

A still further object of the invention is to provide an improved radiant heating panel which is simple of construction, easy and inexpensive to fabricate, and easy and inexpensive to install and maintain.

The novel features that are considered characteristic of the invention are set forth with particularity in the appended claims. The invention itself, however, both as to its organization and its method of operation, together with additional objects and advantages thereof, will best be understood from the following description of specific embodments when read in connection with the accompanying drawings, wherein like reference characters indicate like parts throughout the several figures and in which:

FIGURE 3 is a perspective view, partially broken away to reveal internal details, of a single radiant heating panel such as one of those illustrated in FIGURE 1;

FIGURE 4 is a reduced cross-sectional view of the panel shown in FIGURE 3;

FIGURE 5 is a fragmentary, sectional view taken along line 5—5 of FIGURE 3, but adding a terminal portion of an electrical conductor ready for plugging into the panel;

FIGURE 6 is a cross-sectional view, similar to FIGURE 2, of a modified installation in which adjoining radiant heating unit panels are connected in a different manner by passing the connectors through apertures in the ceiling joists; and FIGURE 7 is a circuit diagram showing a single radiant heating panel connected to a power source and temperature control means.

Figure 1:
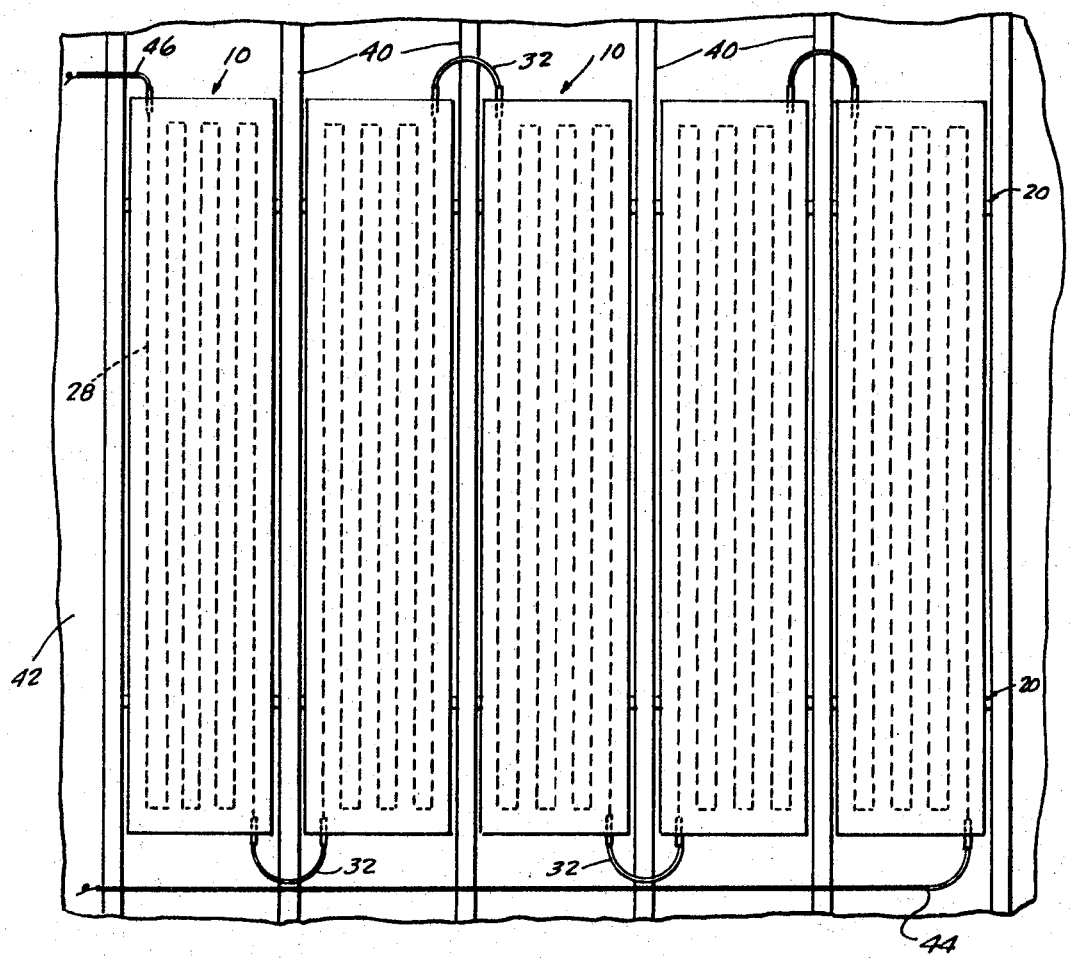
FIGURE 1 is a plan view from above of a number of radiant heating panels, according to the invention, installed above a portion of a ceiling before application of an upper layer of insulating material.

Referring now more particularly to the drawings, in FIGURE 3 is illustrated a preferred form of the improved radiant heating panel 10 as comprising a rectangular body formed of gypsum, sheet rock or the like, and having a width suitable for reception between ceiling joists or wall studs of conventional building constructions. The upper and lower surfaces 12, 14 of the panel are preferably continuous, flat surfaces between the side edges 16, 18 and are devoid of apertures or indicia for marking the points at which conventional fastening means for panels of this nature are usually provided. Explained in another way, conventional panels usually have openings through the panel from one flat surface to the other, or markings at points in said surfaces, which are spaced from the embedded electrical heating conductors so that the panels may be nailed to a wall without harm to the heating elements. In the panel of the present invention, two pairs of spaced mounting brackets 20 are provided at the side edges of the panel. Each mounting bracket preferably comprises an angle member having one leg 22 partially embedded in the panel and partially protruding outwardly from the side edge, and a second leg 24 extending substantially vertically and in a plane perpendicular to the plane of the panel. The second leg 24 of each bracket is apertured at 26 for reception of a fastening nail, or screw, which, upon installation of the panel, enters the joist or stud to attach and fix the panel in position pressed downwardly against the unexposed surface of a ceiling, or wall.

The mounting brackets 20 are completely spaced from the heating cable 28 which is embedded in the flat panel in the usual manner, being arranged in a serpentine path, the legs of which are substantially parallel to one another and spaced apart by at least 1½ inches. No danger, therefore, exists in installing the panel so that the fastening means will enter the panel and break, or otherwise mar the electric resistance wire embedded therein.

The electric heating cable 28 may be chosen of any size to yield a heat output suitable for the area of the panel and the volume of the enclosure to be heated by radiation. The cable is terminated at each end in a socket, or plug connector 30 partially embedded in the panel 10 and protruding from the end thereof for ready connection to a jumpering conductor 32 having a mating plug, or socket 34. Desirably, the mating parts 30, 34 and provided with bayonet pin and slot means 36, 38 shown in FIGURE 5, so that the connection is easily made by merely inserting the plug member 34 in the socket 30 and twisting the two with respect to one another so as to lock the pins 36 in the curved hooked ends of slots 38 to insure a secure connection until the jumper is purposely removed.

The panels 10 may be made in modular sizes which vary in width from 12 to 24 inches so as to fit between studs, or joists, in conventional building structures. The lengths of the panels desirably may be four, six, eight, ten or twelve feet long, enabling the selection of a suitably-sized panel for covering various sized walls or chambers, or enclosures, in such structures. The electrical cable may be sized to accommodate 120 or 240 volts and their wattage may range from 400 to 5,000 watts.

Figure 2:
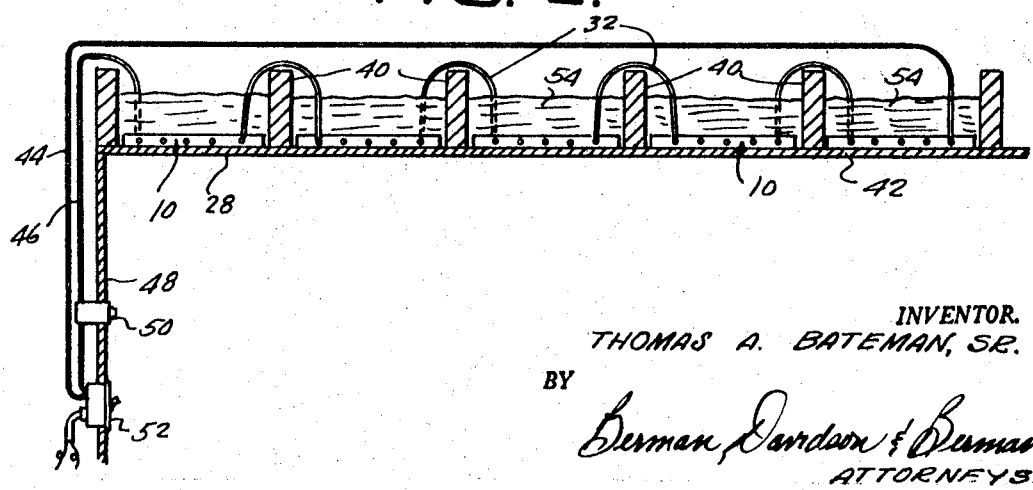
FIGURE 2 is a cross-sectional view of the fragmentary installation shown in FIGURE 1, including the layer of insulating material.

To install the panels, reference is made particularly to FIGURES 1, 2, 5 and 7, wherein it is shown that it is merely necessary to lay a number of panels 10 individually between joists 40 which support an existing ceiling 42. Each of the panels is then pressed down against the unexposed surface of the ceiling and held under pressure while fastening nails are driven through the apertures 26 of the mounting brackets 20 into the sides of the joists. A plurality of jumpers 32 are then laid over the joists and the bayonet plugs 34 inserted in the sockets 30 to connect adjacent panels in series. In a similar manner, a pair of conductors 44, 46 are connected to the end panels, passed over the joists and behind the side wall 48 of the room to a thermostat 50 and a wall switch 52. Insulation batting 54 is laid or blow to a depth of 6 to 8 inches over the panels so as to direct most of the heat downwardly from the panels to the existing ceiling 42. Thus, by conduction, the ceiling becomes the radiant surface for heating the room. It is apparent that the described mode of installing the improved panels is such that even unskilled persons may perform it, and that it involves no disturbance to the existing wall, or ceiling.

Similarly, should it be necessary to remove one of the panels for repair, or replacement, by reason of failure of its heating element, it is merely necessary to untwist the bayonet connectors 30, 34 and unfasten the nails, or screws, in the mounting brackets 20 of the panel being removed. Obviously, these actions are preformed in the region above the ceiling, without disturbing, or marring, the ceiling and without affecting the resistance wire within the panel itself. For this reason, the removal and replacement of individual panels is very simple and easy to perform, and avoids the major disadvantage of conventional panels, which are either formed integrally as part of the ceiling or are directly attached to it so that removal necessitates ripping out and replacement, or redecoration, of the exposed surface of the ceiling.

FIGURE 6 illustrates a slightly modified embodiment in which the panels 10 are identical with, or very similar to, panels already described. The major change involves drilling of apertures 56 through the joists adjacent to the ends of the panels through which the jumpering electrical conductors 58 are passed. Desirably, a twist type, or bayonet, connection is retained, the plug and socket members 30, 34 after locking together being seated in said apertures. When it is necessary to remove a panel, the conductors 58 are pulled out of apertures 56 and the plug and socket members 30, 34 untwisted to unlock, so as to permit removal and replacement of the panel by a similar panel having identical connector means. If desired, another pair of separable connector members 30, 34 may be provided, one member being directly affixed to the panel as shown at 30, FIGURE 5.

FIGURE 7 illustrates an electrical circuit diagram for one panel connected to a power supply, a wall thermostat 50 and a wall switch 52. Obviously, if more than one panel were used they would be connected in series by a plurality of jumpering connectors 32 such as those illustrated in FIGURE 1. The switch 52 is manually operable to turn the radiant heating panel on and off. The thermostat 50 is of conventional type such that it may be regulated to cut off the power to the panel upon the room reaching a selected upper temperature, and cut back on when the room drops to a selected lower temperature.

While the invention has been described and illustrated primarily with respect to installation of panels above a ceiling, it is obvious that the panels may be installed behind a wall of a conventional building structure, as long as the panel is sized in width to fit between the supporting elements of said wall. In any position, the manner of mounting the panel to press against the unexposed surface of the wall yields a very satisfactory means for conducting heat to and through the wall so that the exposed surface of the latter becomes the radiant energy surface with little loss of heat, or efficiency. The installation of panels and their removal, being made behind or above the existing wall, avoids any possibility of injuring the exposed surface and the resulting costs of installing and removal of the heating panels are greatly reduced.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A radiant heating panel for installation adjacent and flat against an unexposed, internal surface of an existing building wall between parallel disposed wall support elements and for fastening to said support elements, said heating panel comprising a flat, rectangular body of substantially uniform thickness having a width corresponding to standard spacings between ceiling joints and wall studs, a pair of opposite, continuous surfaces extending between the side edges of said body devoid of openings and markings for driving of fastening elements through the body, an electric heating cable insulatedly embedded in a central plane parallel to said continuous surfaces and arranged in a serpentine path having parallel portions uniformly spaced over a substantial part of the area of the body, said cable terminating at each end in a connector element at least partially embedded in a side edge of the body and protruding therefrom and a plurality of brackets fixed to opposite sides of said body for clamping the body firmly against an inner, unexposed surface of an interior wall of a building, each of said brackets including a leg portion embedded in said body and protruding from a side edge of the body and another leg portion extending in a plane substantially normal to the plane of one of said continuous surfaces, said normal leg portion having means for attachment to joists and studs supporting an existing wall and for ready removal therefrom without harm to the wall.

2. A radiant heating panel according to claim 1, wherein said connector element is one of a male and female pair having cooperating bayonet type locking members.

References Cited

UNITED STATES PATENTS

| | | | |
|---|---|---|---|
| 2,715,668 | 8/1955 | Booker et al. | 219—345 |
| 2,979,595 | 4/1961 | Deacon | 219—345 |
| 3,056,011 | 9/1962 | Deacon | 219—345 |
| 3,260,835 | 7/1966 | Soukey et al. | 219—345 X |
| 3,343,329 | 9/1967 | Pohutsky | 219—213 X |

FOREIGN PATENTS

| | | |
|---|---|---|
| 132,686 | 6/1949 | Australia. |

ANTHONY BARTIS, *Primary Examiner.*

U.S. Cl. X.R.

219—213, 342, 526, 541